(12) United States Patent
Mikamo et al.

(10) Patent No.: US 8,613,977 B2
(45) Date of Patent: Dec. 24, 2013

(54) MAGNETIC RECORDING MEDIUM AND METHOD FOR MANUFACTURING THE SAME

(75) Inventors: Hisanobu Mikamo, Osaka (JP); Hidekazu Kawatoko, Osaka (JP); Makoto Shiokawa, Osaka (JP); Shinji Kawakami, Osaka (JP); Masanori Yamasaki, Osaka (JP); Hitoshi Tsukamoto, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 1220 days.

(21) Appl. No.: 11/898,757

(22) Filed: Sep. 14, 2007

(65) Prior Publication Data

US 2008/0070066 A1    Mar. 20, 2008

(30) Foreign Application Priority Data

Sep. 19, 2006    (JP) .................................. 2006-253179

(51) Int. Cl.
*B05D 5/12*    (2006.01)

(52) U.S. Cl.
USPC ......................... 427/372.2; 427/130; 427/598

(58) Field of Classification Search
USPC ....................................... 427/598, 372.2, 130
See application file for complete search history.

(56) References Cited

U.S. PATENT DOCUMENTS 3,867,900 A  *  2/1975  Osterhout et al. ............... 118/33
4,567,057 A  *  1/1986  Masuyama et al. ............ 427/549

(Continued)

FOREIGN PATENT DOCUMENTS

JP    58-203631 A    11/1983
JP    61-057039 A    3/1986

(Continued)

OTHER PUBLICATIONS

Japanese Office Action mailed on Apr. 24, 2007 corresponding to Japanese patent application No. 2006-253179.

(Continued)

*Primary Examiner* — Michael Cleveland
*Assistant Examiner* — Tabassom Tadayyon Eslami
(74) *Attorney, Agent, or Firm* — Birch, Stewart, Kolasch & Birch, LLP (57) ABSTRACT

A method for manufacturing a magnetic recording medium of the present invention includes a magnetic layer forming step in which a drying process is performed. The drying process includes: a pre-heating stage in which a magnetic coating film is heated until the surface temperature of the magnetic coating film stops rising and reaches a substantially constant temperature; a constant rate drying stage that is performed after the pre-heating stage in which the surface temperature of the magnetic coating film is held substantially constant; and a falling rate drying stage that is performed after the constant rate drying stage in which the surface temperature of the magnetic coating film is increased to be higher than the surface temperature during the constant rate drying stage to harden the magnetic coating film. The constant rate drying period in which the constant rate drying stage is performed is 0.2 seconds or more. The first solvent is made of one solvent or two or more solvents having different boiling points, and the difference ($T_b - T_s$) between the boiling point $T_b$ of the solvent having the lowest boiling point among the solvents contained in the first solvent and the surface temperature $T_s$ of the magnetic coating film during the constant rate drying period is 1 to 50° C.

11 Claims, 3 Drawing Sheets

(56) References Cited

U.S. PATENT DOCUMENTS

| | | | |
|---|---|---|---|
| 4,678,682 A | | 7/1987 | Asai et al. |
| 2004/0089564 A1* | | 5/2004 | Kuse et al. .................. 206/307 |
| 2004/0110037 A1* | | 6/2004 | Kuse et al. ............ 428/694 BN |
| 2005/0069671 A1* | | 3/2005 | Matsubaguchi et al. ..... 428/64.4 |

FOREIGN PATENT DOCUMENTS

| | | | |
|---|---|---|---|
| JP | 63-42030 A | 2/1988 | |
| JP | 04-111243 A | 4/1992 | |
| JP | 4-229415 A | 8/1992 | |
| JP | 08-015819 A | 1/1996 | |
| JP | 10-124866 A | 5/1998 | |
| JP | 2001-113216 A | 4/2001 | |
| JP | 2004-19958 A | 1/2004 | |

OTHER PUBLICATIONS

Japanese Office Action mailed on Feb. 16, 2010 corresponding to Japanese patent application No. 2007-166708.

* cited by examiner

MAGNETIC RECORDING MEDIUM AND METHOD FOR MANUFACTURING THE SAME

BACKGROUND OF THE INVENTION

1. Field of the Invention

The present invention relates to a magnetic recording medium and a method for manufacturing the same.

2. Description of Related Art

Magnetic recording, media include a magnetic tape, a magnetic disk, a magnetic card and the like. A magnetic tape, which is one of the media, is used for various applications such as audio applications, video applications and computer applications. As for a data backup tape for computers, with an increase in capacity of hard disks to be backed up, magnetic tapes having a recording capacity of several hundred gigabytes (GB) per single tape are commercialized. However, with a further increase in capacity of hard disks, an increase in demand for backup tapes having a large capacity exceeding 1 terabyte (TB) is inevitable. Accordingly, a further increase in capacity of magnetic tapes is crucial.

There are two approaches for increasing the capacity of a magnetic tape: an approach to recording/reproducing apparatuses and an approach to recording media.

The approach to recording/reproducing apparatuses involves, for example, shortening the wavelength of recording signals and narrowing track pitch. This approach reduces the leakage flux from a magnetic tape, so an MR head, which can yield a high output even with a very small flux, is often used as a reproducing head.

The approach to recording medium involves, for example, micronization of a magnetic powder and improvement of magnetic characteristics of a magnetic powder.

Conventionally, as the magnetic powder for forming data backup tape for computers, the same magnetic powders as that used for audio tape or for video tape for household use (e.g., magnetic powders composed of ferromagnetic iron oxide, Co-modified ferromagnetic iron oxide, chromium oxide, etc.) have been used. Currently, the use of an acicular metal powder of ferromagnetic iron having a particle size of about 25 to 65 nm is proposed.

An acicular magnetic powder exhibits magnetic characteristics by its magnetic shape anisotropy. Accordingly, when the particle size is decreased, the coercive force (Hc) decreases, and short wavelength recording characteristics tends to be low. However, a hexagonal Ba-ferrite magnetic powder, an iron nitride magnetic powder, and the like (fine magnetic powders) having a plate or granular shape, which exhibit magnetic characteristics by the crystal magnetic anisotropy even when the particle size is as small as about 5 to 30 nm, are proposed as materials for magnetic recording media.

However, even with use of any of the acicular, granular and plate magnetic powders, if the filling property in a magnetic layer is not increased while reducing the pore size of the magnetic layer, a sufficiently large capacity cannot be achieved. At the same time, in order to allow them to be used in an MR head, which is an approach from recording/reproducing apparatuses as described above, it is necessary to reduce the surface roughness of a magnetic layer to make a smooth surface. To this end, as an approach from production techniques, an improvement of a drying step in which a magnetic coating film is converted into a magnetic layer by removal of solvent is proposed in various documents (see, for example, JP H10-124866A, JP 2004-19958A, JP S63-42030A, JP H4-229415A, etc.).

JP H10-124866A discloses, an apparatus for manufacturing a magnetic recording medium including a plurality of orientation devices equipped with orientation magnets and driers. In this manufacturing apparatus, the temperature and flow rate of the hot air supplied from each drier can be controlled for each orientation device. Also, in this manufacturing apparatus, setting is performed such that the flow rate of the hot air supplied from the plurality of orientation devices increases sequentially along the proceeding direction of a non-magnetic support.

JP 2004-19958A discloses a drying device including not less than two dry zones. In this drying device, a low temperature dry zone is arranged most upstream, and a high temperature dry zone is arranged on a more downstream side than this low temperature dry zone. In the low temperature dry zone, low temperature gas ejection nozzles capable of ejecting a gas having a low temperature and a low humidity are arranged. In the high temperature dry zone, high temperature gas ejection nozzles capable of ejecting a gas having a temperature higher than that of the gas ejected from the low temperature gas ejection nozzles are arranged.

JP S63-42030A discloses an example of a method for manufacturing a magnetic recording medium. According to this manufacturing method, a solvent having a boiling point of not less than 130° C. is contained in a magnetic coating material. Moreover, during a drying process including a constant rate drying stage and a falling rate drying stage, the atmospheric temperature after the falling rate drying stage is set to 40 to 80° C. In JP S63-42030A, the atmospheric temperature of the constant rate drying stage is usually higher than that of the falling rate drying stage. Accordingly, in the method for manufacturing a magnetic recording medium described in JP S63-42030A, there is a moment at which the drying rate (the amount of solvent removed in a unit time) is constant, but constant rate drying is not performed actively. During a constant rate drying stage, the drying rate is constant, whereas in a falling rate drying stage, the drying rate decreases as the amount of the solvent contained in a coating film decreases.

JP H4-229415A discloses a magnetic recording medium and a method for manufacturing the magnetic recording medium. The amount of the solvent remained in the magnetic layer of this magnetic recording medium is 5 mg/m$^2$. JP H4-229415A discloses that the drying rate in the constant rate drying stage of the drying process is set to 1 to 20 kg/m$^2$·hr. However, JP H4-229415A does not disclose that the constant rate drying period is set to 0.2 seconds or more.

As described above, in any of the above-described manufacturing apparatuses and manufacturing methods, the falling rate drying stage is performed without passing through a relatively long constant rate drying stage. This is because if a constant rate drying stage is performed for a longer time, disadvantages will arise such as an increase in size of drying equipment and orientation equipment, and a decrease in production speed.

Moreover, according to the methods described in the above documents, the filling ratio of the magnetic powder in the magnetic layer cannot be increased sufficiently, resulting in insufficient smoothness.

In view of the above, the present invention provides a magnetic recording medium in which the filling ratio of the magnetic powder in the magnetic layer is high and great smoothness is achieved, and a method for manufacturing the magnetic recording medium.

SUMMARY OF THE INVENTION

A method for manufacturing a magnetic recording medium of the present invention is a method for manufacturing a magnetic recording medium in which a magnetic layer is disposed on one main surface of a non-magnetic support, the method including a magnetic layer forming step in which a magnetic coating material containing a magnetic powder, a first binder resin and a first solvent is applied onto one main surface of the non-magnetic support to form a magnetic coating film, and a drying process is performed to remove the first solvent from the magnetic coating film, wherein, in the magnetic layer forming step, the drying process includes: a pre-heating stage in which the magnetic coating film is heated until a surface temperature of the magnetic coating film stops rising and reaches a substantially constant temperature; a constant rate drying stage that is performed after the pre-heating stage in which the surface temperature of the magnetic coating film is held substantially constant; and a falling rate drying stage that is performed after the constant rate drying stage in which the surface temperature of the magnetic coating film is increased to be higher than the surface temperature during the constant rate drying stage to harden the magnetic coating film, a constant rate drying period in which the constant rate drying stage is performed is 0.2 seconds or more, the first solvent is made of one solvent or two or more solvents having different boiling points, and a difference ($T_b - T_s$) between a boiling point $T_b$ of the solvent having the lowest boiling point among the solvents contained in the first solvent and the surface temperature $T_s$ of the magnetic coating film during the constant rate drying period is 1 to 50° C.

A magnetic recording medium of the present invention is manufactured by the above-described method for manufacturing a magnetic recording medium of the present invention.

DETAILED DESCRIPTION OF THE INVENTION

Figure 4:
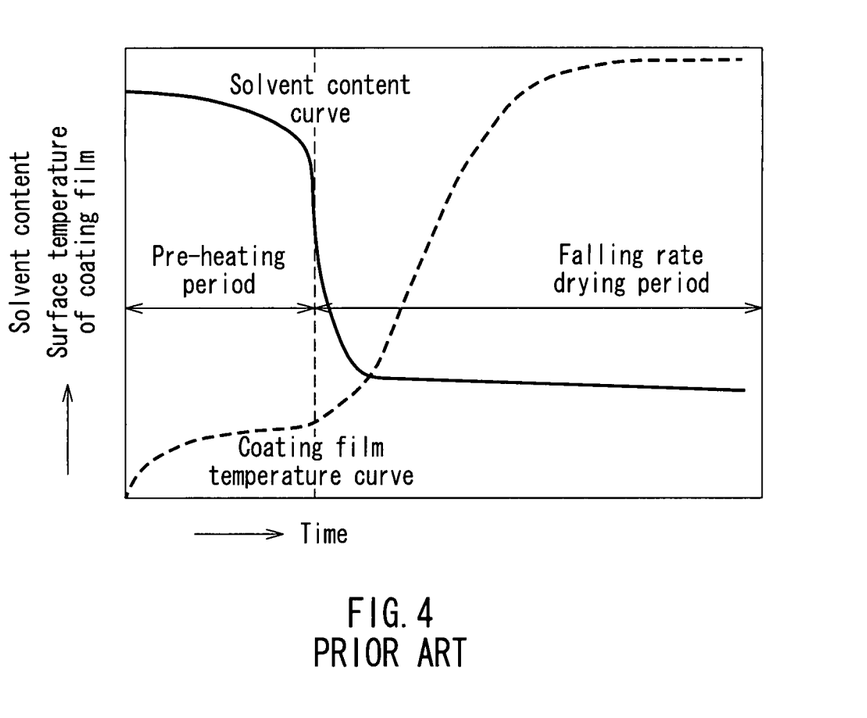
FIG. 4 is a schematic graph showing a relationship between a change in the surface temperature of a coating film and a change in the solvent content of the coating film in an example of a conventional method for manufacturing a magnetic recording medium.

The present inventors studied the conditions for a drying process which is performed after application of a magnetic coating material and the conditions for magnetic field orientation. As a result, as for the drying process, they found that a magnetic layer having excellent magnetic powder-filling property and excellent surface smoothness can be obtained by selecting conditions which cannot be expected with conventional technology. With reference to FIG. 4, the drying process of a conventional method for manufacturing a magnetic recording medium will be described before describing an example of a method for manufacturing a magnetic recording medium of the present invention.

In FIG. 4, the solid curve (solvent content curve) indicates a change in the content of the solvent contained in a coating film (wt %, hereinafter also referred to as "solvent content"), and the dotted curve (coating film temperature curve) indicates a change in the surface temperature of the coating film.

As shown in FIG. 4, upon start of the drying process of a magnetic coating film, which is formed by applying a magnetic coating material onto one main surface of a non-magnetic support, in a drying apparatus, the surface temperature of the coating film keeps rising until it reaches the temperature at which the solvent starts to evaporate rapidly (pre-heating period). During this pre-heating period, the solvent content of the coating film decreases little. After this period, the solvent starts to evaporate actively. According to conventional technology, hot air having a relatively high temperature is supplied to the coating film at a relatively high flow rate. Accordingly, the amount of heat that the coating film receives from the environment becomes much larger than that of the latent heat of evaporation released from the coating film by evaporation of the solvent from the coating film, so the evaporation of the solvent takes place for an extremely short time. The surface temperature $T_s$ of the coating film increases rapidly, and the solvent content of the coating film decreases rapidly without going through a constant rate drying period in which the surface temperature of the coating film is held substantially constant, which will be described later. Gradually, most of the solvent contained in the coating film evaporates, fixing the coating film, and the surface temperature $T_s$ of the coating film approaches the ambient temperature of the drying apparatus (falling rate drying period). As used herein, "fixing" means to make into a state in which the easy axis of magnetization is not oriented back.

In the magnetic layer forming step, when the magnetic powder contained in the magnetic coating film needs to be oriented in a predetermined direction in a magnetic field while the drying process is performed, according to conventional technology, magnetic field orientation is carried out during the period between the completion of application of the magnetic coating material and the end of falling rate drying period. The magnetic field orientation is performed by applying a magnetic field to the coating film from the outside. In the drying process of a conventional method for manufacturing a magnetic recording medium shown in FIG. 4, because the removal (drying) of the solvent is completed in a relatively short time, it is possible to increase the application speed and reduce the length of the drying apparatus, and thus equipment necessary for the magnetic field orientation can be small. For this reason, the conventional method for manufacturing a magnetic recording medium in which such a drying process is performed has an advantage that high production efficiency is achieved while requiring only small equipment investment. However, although this manufacturing method is advantageous for achieving high production efficiency and cost reduction, it is still insufficient for achieving greater smoothness and a higher filling ratio of a magnetic powder in a magnetic layer of a magnetic recording medium.

Figure 1:
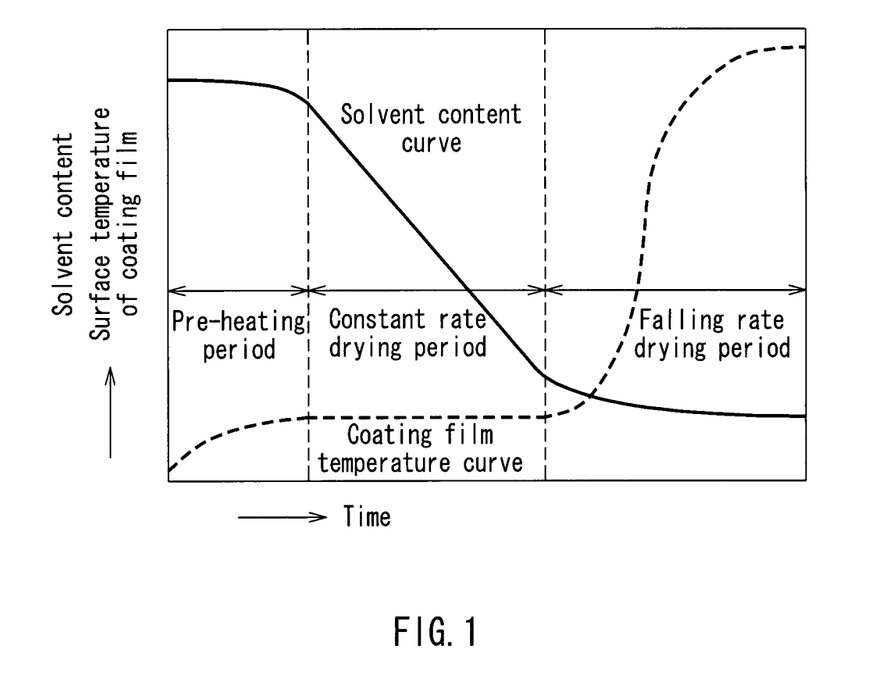
FIG. 1 is a schematic graph showing a relationship between a change in the surface temperature of a coating film and a change in the solvent content of the coating film according to an example of a method for manufacturing a magnetic recording medium of the present invention.

On the other hand, according to a method for manufacturing a magnetic recording medium of this embodiment, a magnetic layer is obtained through a drying process in which the surface temperature $T_s$ of the magnetic coating film is controlled as shown in FIG. 1. The method for manufacturing a magnetic recording medium of this embodiment is applicable not only to a magnetic recording medium having a single layer structure in which a magnetic layer is formed directly on a non-magnetic support, but also to a magnetic recording medium having a multilayer structure in which a magnetic layer is formed on a non-magnetic support with a non-magnetic layer interposed therebetween. Further, according to the method for manufacturing a magnetic recording medium of the present invention, in the magnetic layer forming step, magnetic field orientation for aligning the easy axis of magnetization of the magnetic powder can be, but not necessarily, performed while performing the drying process.

FIG. 1 is a schematic graph showing a relationship between the surface temperature of a coating film and the solvent content of the coating film according to an embodiment of the method for manufacturing a magnetic recording medium of the present invention. In FIG. 1, the solid curve (solvent content curve) indicates a change in the content of the solvent contained in a coating film, and the dotted curve (coating film temperature curve) indicates a change in the surface temperature of the coating film. As shown in FIG. 1, in the method for manufacturing a magnetic recording medium of this embodiment, similarly to the conventional manufacturing method, the surface temperature of the magnetic coating film keeps rising until it reaches the temperature at which the first solvent of the magnetic coating film starts to evaporate rapidly (pre-heating period). As shown in FIG. 1, by going through this pre-heating period, the surface temperature of the magnetic coating film stops rising and reaches a substantially constant temperature. Thereafter, the surface temperature $T_s$ of the magnetic coating film is held substantially constant for 0.2 seconds or more (constant rate drying period). During the constant rate drying period, the amount of the latent heat of evaporation released from the magnetic coating film by evaporation of the first solvent from the magnetic coating film is almost balanced with the amount of heat that the magnetic coating film receives from the environment. Accordingly, the surface temperature $T_s$ of the magnetic coating film is held substantially constant. During this period, the solvent content of the magnetic coating film decreases at a substantially constant rate. When most of the first solvent contained in the magnetic coating film evaporates, the coating film is fixed, and the surface temperature $T_s$ of the first coating film approaches the ambient temperature of the drying apparatus (falling rate drying period). As shown in FIG. 1, during the falling rate drying period, the surface temperature of the magnetic coating film is higher than that during the constant rate drying stage.

As described above, by providing a constant rate drying period of 0.2 seconds or more during the drying process, it is possible to suppress the occurrence of intense currents or air bubbles in a fluid magnetic coating film containing a first solvent during boiling. Further, by providing the constant rate drying period intentionally during the drying process, the period in which the solvent content of the magnetic coating film decreases at a substantially constant rate can be extended, and thus the number of pores, which can be produced in the magnetic coating film by removal of the first solvent, decreases. Accordingly, the magnetic powder can be filled more densely in the magnetic layer. Further, because the surface smoothness of the resulting magnetic layer is improved, the output of the magnetic recording medium is improved.

The thickness of the coating film (hereinafter also referred to as "wet thickness"), when dried, is decreased to 1/3 to 1/8 of that before dried. In the case of a magnetic recording medium of a single layer structure in which a magnetic layer is disposed directly on a non-magnetic support, the thickness of the magnetic layer (hereinafter also referred to as "dry thickness") preferably is 0.1 to 3 μm, and more preferably 0.5 to 2 μm. Accordingly, it is preferable to perform application of the magnetic coating material such that the wet thickness preferably becomes 0.3 to 24 μm, and more preferably 1.5 to 16 μm. In the case of a magnetic recording medium of a multilayer structure in which a magnetic layer is formed on a non-magnetic support with a non-magnetic layer interposed therebetween, the total thickness of the magnetic layer and the non-magnetic layer preferably is 0.1 to 3 μm, and more preferably 0.5 to 2.0 μm. Accordingly, when a magnetic coating material is applied onto a non-magnetic coating film (which will be converted into a non-magnetic layer after drying) before the non-magnetic coating film is dried (i.e., wet-on-wet application method), the total thickness of the magnetic coating film and the non-magnetic coating film preferably is 0.3 to 24 μm, and more preferably 1.5 to 16 μm. In this case, the thickness of the magnetic coating film preferably is 0.03 to 1.6 μm, and more preferably 0.1 to 0.8 μm. The thickness of the non-magnetic coating film preferably is 0.27 to 22.4 μm, and more preferably 1.4 to 15.2 μm.

The constant rate drying period needs to be 0.2 seconds or more. Also when a magnetic coating film is formed on a non-magnetic coating film by wet-on-wet application method, the constant rate drying period needs to be 0.2 seconds or more. When the constant rate drying period is too short (in other words, when the removal speed of solvent is too fast), intense convection currents or air bubbles are likely to occur in the magnetic coating film during drying, which impairs the filling property of the magnetic powder in the resulting magnetic layer and the smoothness of the magnetic layer.

There is no particular limitation on the upper limit for the constant rate drying period, but if it is too long, productivity will decrease significantly. Further, a longer time will be required for fixing, requiring a large number of orientation magnets, and increasing equipment cost. For this reason, it is preferable that the upper limit for the constant rate drying period is 10 seconds or less. From the viewpoint of further enhancing filling property, smoothness and orientation, it is more preferable that the constant rate drying period is not less than 1 second and not greater than 10 seconds.

The surface temperature $T_s$ of the magnetic coating film during the constant rate drying period varies according to the boiling point of the first solvent contained in the magnetic coating film. The first solvent can be made of one solvent or two or more solvents having different boiling points. The difference $(T_b - T_e)$ between the boiling point $T_b$ of the solvent having the lowest boiling point among the one or more solvents contained in the first solvent and the surface temperature $T_s$ of the magnetic coating film is 1 to 50° C. To be more specific, the surface temperature $T_s$ of the magnetic coating film during the constant rate drying period preferably is 30 to 80° C., and thus $T_b$ is higher than this temperature range by 1 to 50° C. By selecting such a solvent, the constant rate drying period can be controlled easily.

The control of the surface temperature $T_s$ of the magnetic coating film during the constant rate drying can be performed by a conventionally known method. Basically, as long as the amount of the latent heat of evaporation released from the magnetic coating film by evaporation of the first solvent from the magnetic coating film is almost balanced with the amount of heat that the magnetic coating film receives from the environment, any conventional method can be used. A specific example is to use, as a heating means, a drier or the like, and appropriately adjust the temperature and flow rate of the hot air, the distance between the magnetic coating film and the heating means, and the like. As the heating means, it is also possible to use a far infrared heater. These heating means may be used alone or in combination.

Also, there is no particular limitation on the method for discharging the evaporated first solvent to the outside of the drying process atmosphere, and it is possible to use a conventionally known method. For example, the first solvent can be discharged to the outside of the above atmosphere in the state of a vapor, or can be discharged to the outside of the above atmosphere after the first solvent is once condensed by a condensing means.

The total amount of components other than the first solvent contained in the magnetic coating material used for forming a magnetic coating film (hereinafter also referred to as "solvent-excluded components") relative to the total amount of components contained in the magnetic coating material preferably is 10 to 50 wt %, and more preferably 20 to 35 wt %. If the amount of the solvent-excluded components contained in the magnetic coating material is too small, the viscosity will be too low, deteriorating the dispersibility of the solvent-excluded components, and degrading the uniformity of the magnetic coating film. Conversely, if the amount of the solvent-excluded components contained in the magnetic coating material is too large, the viscosity will be too high, degrading the application suitability of the magnetic coating material. Accordingly, the amount of the first solvent in the coating material preferably is 50 to 90 wt %, and more preferably 65 to 80 wt %.

There is no particular limitation on the first solvent contained in the magnetic coating material as long as a conventionally known solvent for use in a coating material for forming a magnetic layer is used. For example, the following can be used: ketone-based solvents such as methyl ethyl ketone (boiling point: 80° C.), cyclohexanone (boiling point: 156° C.) and methyl isobutyl ketone (boiling point: 116° C.); ether-based solvents such as tetrahydrofuran (boiling point: 66° C.) and dioxane (boiling point: 101° C.); acetate ester-based solvents such as ethyl acetate (boiling point: 77° C.) and butyl acetate (boiling point: 127° C.); toluene (boiling point: 111° C.); and the like. They may be used alone or in combination of two or more. Among them, from the viewpoint of the solubility for binder resin contained in the magnetic coating material (hereinafter also referred to as "first binder resin"), dispersibility for magnetic powder, evaporation speed, and cost, it is preferable to use cyclohexanone, methyl ethyl ketone, tetrahydrofuran or toluene.

As described above, when the magnetic recording medium has a single layer structure, the magnetic coating film preferably has a thickness of 0.3 to 24 µm, and more preferably 1.5 to 16 µm. When the magnetic recording medium has a multilayer structure, the magnetic coating film preferably has a thickness of 0.03 to 1.6 µm, and more preferably 0.1 to 0.8 µm. The above ranges are preferable because if the thickness of the magnetic coating film is too small, it will be difficult to form a uniform magnetic coating film, even difficult to form a magnetic coating film itself. If the thickness of the magnetic coating film is too large, (i.e., if the thickness of the magnetic layer is too large), the electromagnetic conversion characteristics will decrease, or the cost will increase.

When magnetic field orientation is performed concurrently with the drying process, the magnetic field orientation can be performed by a conventionally known method according to the type of magnetic recording medium. More specifically, for the magnetic field orientation, for example, a permanent magnet, a solenoid coil and others that generate a magnetic field can be used alone or in combination.

For example, in a production line for producing a long magnetic tape, an area in which a magnetic coating material is applied onto one main surface of a non-magnetic support is defined as "application zone", and an area in which a magnetic coating film formed in the application zone is dried is defined as "dry zone". In the dry zone, the magnetic coating film is subjected to pre-heating, constant rate drying and falling rate drying in this order. In this case, permanent magnets are arranged between the application zone and the dry zone. In the dry zone, a plurality of solenoid coils are arranged. It is preferable that, in the dry zone, magnetic field orientation using solenoid coils is performed for the magnetic coating film until it is completed. Thereby, it is possible to perform magnetic field orientation in an efficient and insured manner. It is also possible to perform magnetic field orientation using solenoid coils for the magnetic coating film that is being subjected to the pre-heating stage. However, this requires large size orientation equipment, a large space for installing the equipment, and significant cost. For this reason, magnetic field orientation is not necessarily performed for the magnetic coating film that is being subjected to the pre-heating stage.

When most of the solvent contained in the magnetic coating film is removed through the constant rate drying stage, it is preferable that the magnetic coating film is subjected to magnetic field orientation using solenoid coils at least until the falling rate drying stage is started. This is because if the magnetic coating film under solvent removal is moved away from the magnetic field, the easy axis of magnetization oriented in the same direction may be disrupted.

The intensity of the external magnetic field applied by the permanent magnets preferably is 5 to 15 kOe. The intensity of the external magnetic field applied by the solenoid coils preferably is 1.5 to 10 kOe.

Figure 2:
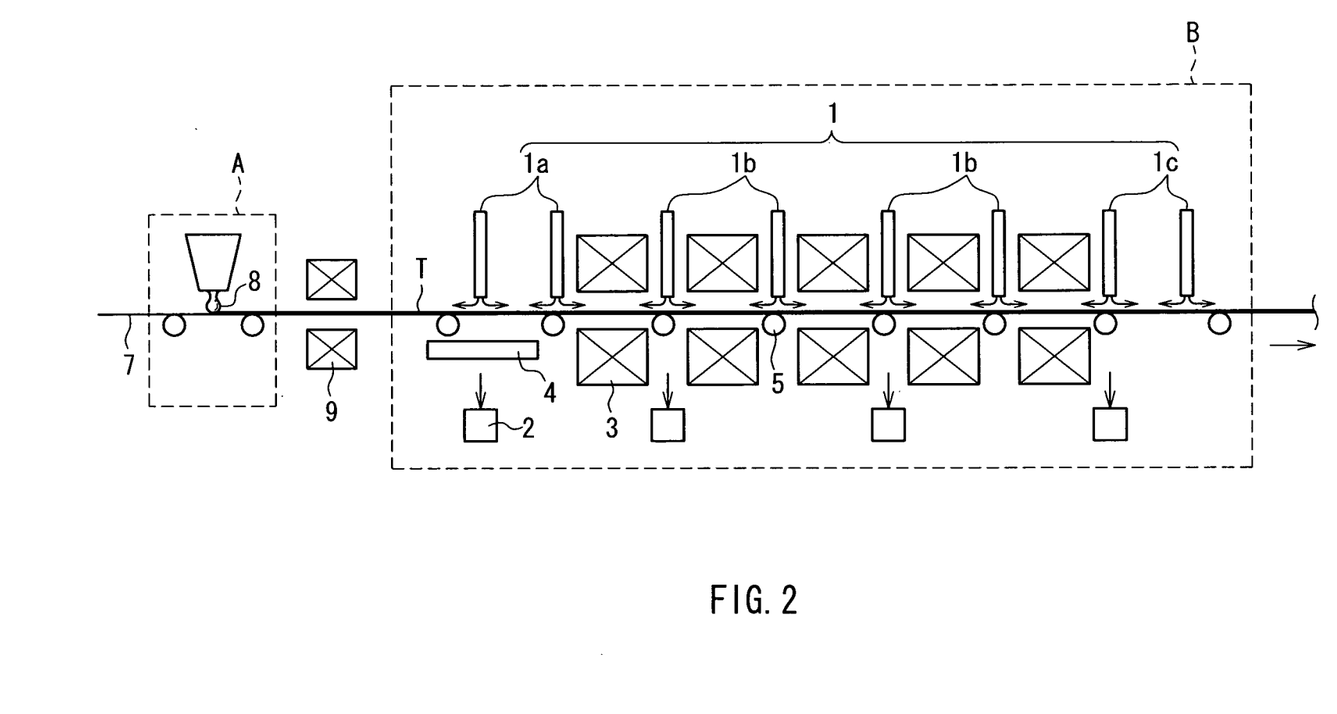
FIG. 2 is a schematic diagram showing the flow of a drying process of a method for manufacturing a magnetic recording medium according to an example of the present invention.

An example of a method for manufacturing a magnetic recording medium of the present invention will be described in further detail with reference to FIG. 2. FIG. 2 is a schematic diagram showing the flow of a drying process of a method for manufacturing a magnetic recording medium according to one example of the present invention.

First, in an application zone A, a magnetic coating material 8 containing a magnetic powder is applied onto one main surface of a strip-shaped non-magnetic support 7 to form a magnetic coating film. Subsequently, a strip-shaped laminate T including the non-magnetic support 7 and the magnetic coating film is passed through a repulsive magnetic field formed between a pair of permanent magnets 9 and transported to a dry zone B.

The application of the magnetic coating material is performed by a conventionally known method such as a gravure coating method or die coating method. The means for transporting the non-magnetic support 7 and the laminate T includes, for example, a plurality of guide rollers 5 or the like.

In the dry zone B, a plurality of hot air supply units 1, a heater 4, discharge units 2 that discharge hot air containing a solvent vapor, and a plurality of solenoid coils 3 are arranged. The plurality of solenoid coils 3 are arranged, for example, at an equal spacing along the proceeding direction of the production line. The hot air supply unit 1 is, for example, a drier capable of ejecting hot air. The number and position of the hot air supply units 1 and the discharge units 2 are determined appropriately considering the application speed, the length of the dry zone, and the like.

The plurality of hot air supply units 1 include first hot air supply units 1*a* disposed on the upstream side from all of the solenoid coils 3, second hot air supply units 1*b* disposed between each adjacent solenoid coils 3, and third hot air supply units 1*c* disposed on the downstream side from all of the solenoid coils 3. As used herein, "upstream side" refers to the side close to the application zone A in the transport direction of the laminate T, and "downstream side" refers to the side away from the application zone A.

The laminate T transported to the dry zone B is first pre-heated by hot air ejected from the plurality of first hot air supply units 1*a*. It is preferable that the hot air supplied from the first hot air supply units 1a has a relatively low temperature and is introduced at a relatively low flow rate. The preferred temperature and the preferred flow rate vary according to the thickness of the magnetic coating film, the type of solvent (solvent composition) contained in the magnetic coating film, the application speed of the magnetic coating material, and the like. Usually, the temperature preferably is 35 to 90° C., and the flow rate preferably is 0.5 to 15 m/sec. If the temperature of the hot air is too low and/or the flow rate of the hot air is too low, pre-heating cannot be performed sufficiently, and the start of the constant rate drying also is delayed. Conversely, if the temperature of the hot air is too high and/or the flow rate of the hot air is too high, the surface temperature $T_s$ of the magnetic coating film during constant rate drying will be too high, making it difficult to control the constant rate drying period within a preferred range.

It is preferable that the distance between the first hot air supply units 1a and the laminate T is 1 to 100 cm. If the distance is too short, the hot air will blow too hard on the magnetic coating film, and thus uneven drying is likely to occur, or the inside of the magnetic coating film may be dried unevenly. Conversely, if the distance is too long, the hot air will not sufficiently reach the surface of the magnetic coating film, failing to perform sufficient drying.

The heater 4 is, for example, a far infrared heater. In a far infrared heater, the heating element has an area much larger than that of a drier, so a far infrared heater can uniformly heat a large area at a time. The heater 4 is not necessarily required, but it is preferable to provide the heater 4 because the magnetic coating film of the laminate T can be pre-heated uniformly.

The pre-heated laminate T is then heated by hot air supplied from the second hot air supply units 1b for 0.2 seconds or more such that the surface temperature $T_s$ of the magnetic coating film is maintained at a substantially constant level. The term "substantially constant" is not limited to "strictly constant", and encompasses "approximately constant", that is, for example, the values within ±1° C. are also included.

The constant rate drying period in which the surface temperature $T_s$ of the magnetic coating film is maintained at a substantially constant level can be controlled by the temperature of hot air, the flow rate, and the like. The constant rate drying period needs to be 0.2 seconds or more. If the constant rate drying period is too short (in other words, if the removing speed of solvent is too fast), intense convection currents or air bubbles occur in the magnetic coating film during drying, which impairs the filling property and smoothness of the magnetic layer. There is no particular limitation on the upper limit for the constant rate drying period, but if the constant rate drying period is too long, not only the effect obtained by providing the constant rate drying period will be saturated, but also the productivity will decrease significantly, resulting in an equipment size increase and a production cost increase. Accordingly, it is preferable that the upper limit for the constant rate drying period is 10 seconds or less. In order to enhance the orientation as well as the filling property and smoothness, it is more preferable that the constant rate drying period is not less than 1 second and not greater than 10 seconds.

The surface temperature $T_s$ of the magnetic coating film during constant rate drying varies according to the thickness of the magnetic coating film, the solvent composition of the magnetic coating film, the application speed of the magnetic coating material, and the like. Preferably, the surface temperature $T_s$ is 30 to 80° C., and more preferably 40 to 70° C. This is because by controlling the surface temperature $T_s$ of the coating film within the above range, the constant rate drying period can be controlled to fall within the preferred range.

The preferred temperature and the preferred flow rate of the hot air supplied from the second hot air supply units 1b vary according to the thickness of the magnetic coating film, the solvent composition of the magnetic coating film, the application speed of the magnetic coating material, and the like. Preferably, the temperature is 40 to 100° C., and the flow rate is 0.5 to 15 m/sec. If the temperature of the hot air it too low and/or the flow rate of the hot air is too low, the constant rate drying period will be too long, decreasing the production efficiency. Conversely, if the temperature of the hot air is too high and/or the flow rate of the hot air is too high, the constant rate drying period will be too short, reducing the filling ratio of the magnetic powder in the magnetic layer, and degrading the surface smoothness of the magnetic layer.

It is preferable that the distance between the second hot air supply units 1b and the laminate T is 1 to 100 cm. If the distance is too short, the hot air will blow too hard on the magnetic coating film, and thus uneven drying is likely to occur, or the inside of the magnetic coating film may be dried unevenly. Conversely, if the distance is too long, the hot air will not sufficiently reach the surface of the magnetic coating film, failing to perform sufficient drying.

After having passed under the second hot air supply units 1b, the laminate T is then further heated by hot air ejected from the third hot air supply unit 1c. It is preferable that the hot air supplied from the third hot air supply unit 1c has a relatively high temperature and is introduced at a relatively high flow rate. This is because by removing the first solvent remaining in the magnetic coating film as much as possible in a relatively short time by supplying a larger amount of heat to the magnetic coating film than that supplied during constant rate drying, the falling rate drying period can be shortened. Thereby, the increase in equipment size accompanied by performing the constant rate drying process for a predetermined period of time can be suppressed. Also, the final amount of the solvent remaining in the magnetic coating film can be reduced, so the running durability of the magnetic layer can be improved. As used herein, "the final amount of the solvent remaining in the magnetic coating film" refers to a very small amount of remaining solvent which cannot be removed even through a drying process.

The preferred temperature and the preferred flow rate of the hot air supplied from the third hot air supply unit 1c vary according to the thickness of the magnetic coating film, the type of solvent (solvent composition) contained in the magnetic coating film, the application speed of the magnetic coating material, and the like. In order to supply a larger amount of heat to the magnetic coating film than that supplied during constant rate drying, usually, the temperature preferably is 60 to 120° C., and the flow rate preferably is 0.5 to 15 m/sec. If the temperature of the hot air is too low and/or the flow rate of the hot air is too low, the final amount of the solvent remaining in the magnetic coating film increases, reducing the running durability of the magnetic layer. Conversely, if the temperature of the hot air is too high and/or the flow rate of the hot air is too high, the non-magnetic support may be heat-deformed.

It is preferable that the distance between the third hot air supply unit 1c and the laminate T is 1 to 100 cm. If the distance is too short, the hot air will blow too hard on the magnetic coating film, and thus uneven drying is likely to occur, or the inside of the magnetic coating film will be dried unevenly. Conversely, if the distance is too long, the hot air will not sufficiently reach the surface of the magnetic coating film, failing to perform sufficient drying.

It is also possible to provide, where appropriate, a heating means such as a drier or far infrared heater further on the downstream side from the third hot air supply unit 1c in the production line, whereby a very small final amount of the solvent remaining in the magnetic coating film can be reduced, improving the durability of the magnetic layer.

In a configuration described with reference to FIG. 2, the hot air supply direction is perpendicular to the proceeding direction of the laminate T, but the hot air supply direction is not limited thereto. In order to control the constant temperature drying period to fall within the preferred range, for example, the hot air supply units 1 may be tilted such that the hot air supplied from the hot air supply units 1 flows from the downstream side to the upstream side. It is also possible to adjust the constant temperature period to fall within a desired range by appropriately setting the position and number of the discharge units 2.

The temperatures and flow rates of the hot air supplied from the first hot air supply units 1a, the second hot air supply units 1b and the third hot air supply units 1c are not necessarily different, and may be the same. However, for example, if the same temperature and the same flow rate are set for the hot air supplied from the first hot air supply unit 1a, that supplied from the second hot air supply units 1b and that supplied from the third hot air supply unit 1c while insuring a constant rate drying period of 2 seconds or more, the length of the dry zone will be long, increasing the size of the equipment necessary for magnetic field orientation. For this reason, it is preferable that the amount of heat supplied by the heating means such as the hot air supply unit is increased in the order from the first hot air supply unit 1a, the second hot air supply unit 1b and the third hot air supply unit 1c.

The foregoing describes an example of the method for manufacturing a magnetic recording medium having a single layer structure in which a magnetic layer is disposed directly on one main surface of a non-magnetic support, but it is also possible to manufacture, in the same manner, a magnetic recording medium having a multilayer structure in which a magnetic layer is disposed on one main surface of a non-magnetic support with a non-magnetic layer interposed therebetween.

Figure 3:
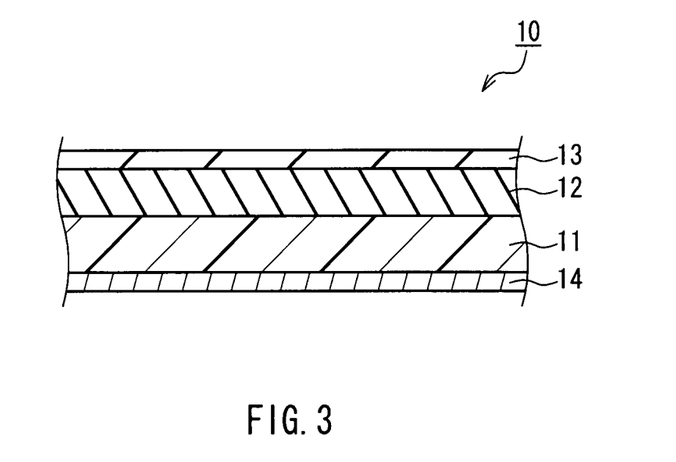
FIG. 3 is a cross sectional view showing a part of an example of a magnetic recording medium of the present invention.

An example of a magnetic recording medium manufactured by the method for manufacturing a magnetic recording medium of the present invention will be described now. In a magnetic recording medium 10 manufactured by an example of the method for manufacturing a magnetic recording medium of the present invention, as shown in FIG. 3, a non-magnetic layer 12 and a magnetic layer 13 are placed in this order on one main surface of a non-magnetic support 11. A back coat layer 14 is placed on the other main surface of the non-magnetic support 11. However, the non-magnetic layer 12 and the back coat layer 14 are not necessarily required, and can be formed where appropriate.

In the present invention, the magnetic characteristics of the ferromagnetic powder are indicated by a value measured by a sample vibration type fluxmeter by applying an external magnetic field of 1273.3 kA/m (16 kOe).

Also, in the present invention, the average particle size is indicated by a value (number-average particle size) obtained by measuring the maximum diameter (longitudinal axis diameter in the case of an acicular powder, plate diameter in the case of a plate powder) of 100 particles in an image obtained by a transmission electron microscope (TEM) and then averaging the measured values.

<Non-Magnetic Support>

The thickness of the non-magnetic support 11 varies according to the application of the magnetic recording medium. Usually, the thickness is 2 to 8 µm, and more preferably 2.5 to 6 µm. If the thickness of the non-magnetic support 11 is too small, it will be difficult to form a magnetic coating film as well as a non-magnetic coating film that is formed with a non-magnetic coating material, and the strength of the magnetic recording medium will be small. Conversely, if the thickness of the non-magnetic support 11 is too large, the total thickness of the magnetic recording medium will increase, which may reduce, for example, the recording capacity per single magnetic tape.

It is preferable that the Young's modulus in the longitudinal direction of the non-magnetic support 11 is 6 GPa (612 kg/mm$^2$) or greater, and more preferably 8 GPa (816 kg/mm$^2$) or greater. If the Young's modulus is too small, the magnetic tape runs unstably. In the case of a magnetic tape in which information is recorded by helical scan method, it is preferable that the rate of Young's modulus in the longitudinal direction (MD) to Young's modulus in the width direction (TD) is 0.60 to 0.80, and more preferably 0.65 to 0.75. This is because, if the rate (Young's modulus in MD/Young's modulus in TD) is too small or too large, although the mechanism is not understood yet, a variation (flatness) in the output between the input side and the output side of the track of the magnetic head increases. The flatness becomes minimum when the rate (Young's modulus in MD/Young's modulus in TD) is around 0.70. In the case of a magnetic tape in which information is recorded by linear recording method, the rate (Young's modulus in MD/Young's modulus in TD) preferably is 0.70 to 1.30 because, although the reason is not clearly known, the flatness can be reduced. Examples of a non-magnetic support 11 that satisfies these characteristics include a biaxially stretched aromatic polyamide base film and a biaxially stretched aromatic polyimide film.

<Non-Magnetic Layer>

As will be described later, in order to reduce the thickness loss, or to increase the resolution when information is recorded with short wavelengths, it is preferable to adjust the thickness of the magnetic layer 13 to be less than 0.2 µm. When the thickness of the magnetic layer 13 is adjusted to be less than 0.2 µm, in order that durability of the magnetic layer 13 is insured and a magnetic coating material can be applied uniformly, it is preferable to form a non-magnetic layer 12 between the non-magnetic support 11 and the magnetic layer 13. The non-magnetic layer 12 includes, for example, a non-magnetic powder, a second binder resin, and the like. As the second binder resin contained in the non-magnetic layer 12, for example, the same binder resin as the first binder resin of the magnetic layer 13 can be used.

The thickness of the non-magnetic layer 12 preferably is not less than 0.2 µm and not greater than 2.0 µm, more preferably not greater than 1.5 µm, and further preferably not greater than 0.5 µm. If the thickness of the non-magnetic layer 12 is too small, the surface irregularity of the non-magnetic support will affect the magnetic layer 13, deteriorating the effect of reducing a variation in thickness of the magnetic layer 13 and the effect of insuring the durability, which are obtained by forming the non-magnetic layer 12. Conversely, if the thickness of the non-magnetic layer 12 is too large, the total thickness of the magnetic tape will increase excessively, reducing the recording capacity per single magnetic tape. The surface irregularity of the non-magnetic support is very large when compared to the smoothness level of the magnetic layer.

Components of the non-magnetic powder include carbon black, titanium oxide, iron oxide, aluminum oxide, and the like. Usually, carbon black is used alone, or a mixture of carbon black with other non-magnetic powder such as titanium oxide, iron oxide or aluminum oxide is used. In order to form a coating film having a less variation in thickness to make the non-magnetic layer 12 smooth, it is preferable to use a non-magnetic powder having a sharp particle size distribution. The non-magnetic powder preferably has an average particle size of, for example, 10 to 1000 nm, and more preferably 10 to 500 nm from the viewpoint of insuring uniformity, surface smoothness, rigidity and conductivity for the non-magnetic layer 12.

As the second solvent contained in the non-magnetic coating material for forming the non-magnetic layer 12, for example, the same solvent as the first solvent contained in the magnetic coating material can be used. Similarly to the first solvent, the second solvent is made of one solvent or two or more solvents having different boiling points. It is preferable that the difference ($tb-T_e$) between the boiling point tb of the solvent having the lowest boiling point among the solvents contained in the first and second solvents and the surface temperature $T_s$ of the magnetic coating film during the constant rate drying period is 1 to 50° C. By selecting such a solvent, the constant rate drying period can be controlled easily.

The total amount of the solvent-excluded components (i.e., the components other than the second solvent) contained in the non-magnetic coating material preferably is 10 to 50 wt %, and more preferably 20 to 35 wt %. If the total amount of the solvent-excluded components contained in the non-magnetic coating material is too small, the viscosity will be too low, decreasing the dispersibility of the non-magnetic powder, and thus the interface between the magnetic coating film and the non-magnetic coating film will be roughened. Conversely, if the total amount of the solvent-excluded components contained in the non-magnetic coating material is too large, the viscosity will be too high, degrading the application suitability of the non-magnetic coating material. Accordingly, the amount of the second solvent in the non-magnetic coating material preferably is 50 to 90 wt %, and more preferably 65 to 80 wt %.

<Surface Treating Agent>

It is preferable that the non-magnetic powder contained in the non-magnetic layer 12 and the magnetic powder contained in the magnetic layer 13 are surface-treated so as to improve dispersibility. As a surface treating agent usable for the surface treatment, a phosphorous-based surface treating agent, a carboxylic acid-based surface treating agent, an amine-based surface treating agent, a chelating agent, various silane coupling agents, and the like are preferably used.

Examples of the phosphorous-based surface treating agent include: alkyl phosphoric acid esters such as monomethyl phosphate, dimethyl phosphate, monoethyl phosphate and diethyl phosphate; and aromatic phosphoric acids such as phenyl phosphonic acid and monooctyl phenyl phosphonic acid. Commercially available products can be used such as GARFAC RS410 available from TOHO Chemical Industry Co., Ltd, and JP-502, JP-504 and JP-508 available from Johoku Chemical Co., Ltd.

Examples of the carboxylic acid-based surface treating agent include benzoic acid, phthalic acid, tetracarboxyl naphthalene, dicarboxyl naphthalene, and fatty acid having 12 to 22 carbon atoms.

Examples of the amine-based surface treating agent include aliphatic amine having 8 to 22 carbon atoms, aromatic amine, alkanolamine and alkoxyalkylamine.

Examples of the chelating agent include 1,10-phenanthroline, EDTA (ethylenediaminetetraacetic acid), dimethylglyoxime, acetyl acetone, glycine, dithiazone and nitrilotriacetic acid.

The amount of the surface treating agent preferably is 0.5 to 5 parts by weight relative to 100 parts by weight of the magnetic powder. The molecular weight of the surface treating agent preferably is not greater than 1000, and more preferably not greater than 500. It is preferable to add the surface treating agent before the components of the non-magnetic coating material or magnetic coating material are kneaded, during kneading, in a period after kneading and before dispersing in the solvent, or during dispersion in the solvent.

<Magnetic Layer>

It is preferable that the thickness of the magnetic layer 13 is, when formed directly on the non-magnetic support 11, 0.1 to 3 µm, and more preferably 0.5 to 2 µm. When the magnetic layer 13 is formed on the non-magnetic support 11 with the non-magnetic layer 12 interposed therebetween, the thickness of the magnetic layer 13 preferably is not less than 0.01 µm and less than 0.2 µm, and more preferably not less than 0.03 and not greater than 0.1 µm. The above ranges are preferable because if the thickness is too small, the resulting output will be small, and it is difficult to form a uniform magnetic layer 13. If the thickness is too large, the resolution characteristics for short wavelength recording will degrade.

As the magnetic powder contained in the magnetic layer 13, it is preferable to use a ferromagnetic iron-based metal magnetic powder, iron nitride magnetic powder, plate hexagonal Ba-ferrite magnetic powder or the like.

The ferromagnetic iron-based metal magnetic powder preferably has an average particle size of 10 to 60 nm, and more preferably 15 to 45 nm. If the average particle size is too small, the coercive force (Hc) will decrease or the surface energy of the particles will increase, and thus the dispersion in the magnetic coating material will be difficult. Conversely, if the average particle size is too large, the particle noise due to the particle size will increase.

It is preferable that the ferromagnetic iron-based metal magnetic powder has a coercive force of 160 to 320 kA/m (2010 to 4020 Oe), and more preferably 200 to 300 kA/m (2515 to 3770 Oe). The saturation magnetization value preferably is 60 to 200 A·m$^2$/kg (60 to 200 emu/g), and more preferably 80 to 180 µm$^2$/kg (80 to 180 emu/g).

One of the indicators that show the orientation of a magnetic powder in a magnetic recording medium is a squareness ratio (Br/Bs). It is preferable that the squareness ratio (Br/Bs) is 0.8 or greater, and more preferably 0.84 or greater. Bs represents the saturation magnetic flux density, and Br represents the residual magnetic flux density.

It is preferable that the ferromagnetic iron-based metal magnetic powder has a BET specific surface area of not less than 35 m$^2$/g, more preferably not less than 40 m$^2$/g, further more preferably 50 m$^2$/g. There is no particular limitation on the upper limit for the BET specific surface area, but usually, the BET specific surface area is 100 m$^2$/g or less.

The ferromagnetic iron-based metal magnetic powder may further contain, as a metal element that forms the magnetic powder, a transition metal such as Mn, Zn, Ni, Cu or Co. It is preferable that the ferromagnetic iron-based metal magnetic powder contains Co or Ni. Particularly, Co is preferable because it can best improve the saturation magnetization value.

It is preferable that the atomic ratio of the transition metal element contained to Fe contained in the magnetic powder is 5 to 50:100, and more preferably 10 to 30:100.

The ferromagnetic iron-based metal magnetic powder may further contain, in addition to the transition metal element, as another metal element that forms the magnetic powder, at least one rare-earth element selected from yttrium, cerium, ytterbium, cesium, praseodymium, samarium, lanthanum, europium, neodymium and terbium. Among them, at least one selected from cerium, neodymium, samarium, terbium and yttrium is preferable because when they are contained, a high coercive force (Hc) can be obtained. It is preferable that the atomic ratio of the rare-earth element contained to Fe contained in the alloy is 0.2 to 20:100, more preferably 0.3 to 15:100, and further more preferably 0.5 to 10:100.

The iron nitride magnetic powder can be a conventional one. The shape of the iron nitride magnetic powder can be acicular, spherical, irregular cubic, or the like.

It is preferable that the iron nitride magnetic powder has a coercive force of 160 to 320 kA/m (2010 to 4020 Oe), and more preferably 200 to 300 kA/m (2515 to 3770 Oe). The saturation magnetization value of the iron nitride magnetic powder preferably is 60 to 200 $A \cdot m^2/kg$ (60 to 200 emu/g), and more preferably 80 to 180 $A \cdot m^2/kg$ (80 to 180 emu/g).

The iron nitride magnetic powder preferably has an average particle size of 5 to 20 nm, and more preferably 10 to 17 nm. If the average particle size is too small, the coercive force (Hc) will decrease and the surface energy of the particles will increase, and thus the dispersion in the magnetic coating material will be difficult. Conversely, if the average particle size is too large, the particle noise due to the particle size will increase. Also, the iron nitride magnetic powder preferably has a BET specific surface area of not less than 35 $m^2/g$, more preferably not less than 40 $m^2/g$, and further more preferably not less than 50 $m^2/g$. There is no particular limitation on the upper limit for the BET specific surface area, but usually, the BET specific surface area preferably is 100 $m^2/g$ or less.

The ferromagnetic iron-based metal magnetic powder and/or the iron nitride magnetic powder may be surface-treated by Al, Si, P, Y, Zr or an oxide thereof so as to improve corrosion resistance and dispersibility as well as to control the coercive force.

The hexagonal Ba-ferrite magnetic powder preferably has a coercive force of 120 to 320 kA/m, and a saturation magnetization value of 40 to 60 $A \cdot m^2/kg$ (40 to 60 emu/g). Also, the hexagonal Ba-ferrite magnetic powder preferably has an average particle size (the length of the longest portion of a plate surface, plate diameter) of 10 to 30 nm, more preferably 10 to 25 nm, and further more preferably 10 to 20 nm. If the average particle size is too small, the surface energy of the particles will increase, and thus the dispersion in the magnetic coating material will be difficult. Conversely, if the average particle size is too large, the particle noise due to the particle size will increase. Also, the plate ratio (plate diameter/plate thickness) preferably is less than 3, and more preferably not greater than 2. The hexagonal Ba-ferrite magnetic powder preferably has a BET specific surface area of 1 to 100 $m^2/g$.

It is preferable that the product obtained by multiplying the residual magnetic flux density in the longitudinal direction of the magnetic layer 13 and the thickness of the magnetic layer is 0.0018 to 0.05 μTm, more preferably 0.0036 to 0.05 μTm, and further more preferably 0.004 to 0.05 μTm. If the product obtained by multiplying the residual magnetic flux density and the thickness of the magnetic layer 13 is too small, the reproduction output by an MR head will be small. If the product is too large, the reproduction output by an MR head is likely to be distorted. A magnetic recording medium having a magnetic layer 13 in which the above product falls within this range is preferable because short wavelength recording can be performed. In addition, the reproduction output when reproduced by an MR head will be large, and the distortion of the reproduction output will be small, increasing the output-to-noise ratio.

The binder resin (first binder resin) contained in the magnetic layer 13 and the binder resin (second binder resin) contained in the non-magnetic layer 12 are made of combination of polyurethane resin and at least one selected from the group consisting of vinyl chloride resin, vinyl chloride-vinyl acetate copolymer resin, vinyl chloride-vinyl alcohol copolymer resin, vinyl chloride-vinyl acetate-vinyl alcohol copolymer resin, vinyl chloride-vinyl acetate-maleic anhydride copolymer resin, vinyl chloride-hydroxyl group-containing alkyl acrylate copolymer resin and cellulose resin. As the cellulose resin, nitrocellulose resin can be used, for example.

Among them, it is preferable to use a combination of vinyl chloride-hydroxyl group-containing alkyl acrylate copolymer resin and polyurethane resin. Examples of polyurethane resin include polyester polyurethane resin, polyether polyurethane resin, polyether polyester polyurethane resin, polycarbonate polyurethane resin, and polyester polycarbonate polyurethane resin.

As the polyurethane resin, it is also possible to use a polyurethane resin composed of a polymer having an epoxy group or a functional group such as —COOH, —SO$_3$M, —OSO$_3$M, —P=O(OM)$_3$, —O—P=O(OM)$_2$, where M represents a hydrogen atom, alkali metal base or amine salt, —OH, —NR'R'' or —N+R''' R''''R''''', where R', R'', R''', R'''' and R''''' each represent a hydrogen atom or hydrocarbon group. With such a polyurethane resin, the dispersibility of powder such as a magnetic powder in the magnetic coating material can be improved.

When two or more binder resins are combined for use, it is preferable that the resins have functional groups of the same polarity. Particularly, it is preferable that two binder resins each have a —SO$_3$M group.

In the magnetic coating material for forming a magnetic layer, it is preferable that the first binder resin is contained in an amount of 7 to 50 parts by weight relative to 100 parts by weight of the magnetic powder, and more preferably 10 to 35 parts by weight. When the first binder resin includes a vinyl chloride-based resin and polyurethane resin, it is preferable that the vinyl chloride-based resin is contained in an amount of 5 to 30 parts by weight and the polyurethane resin is contained in an amount of 2 to 20 parts by weight relative to 100 parts by weight of the magnetic powder.

The amount of the second binder resin contained in the non-magnetic coating material for forming a non-magnetic layer preferably is 10 to 55 parts by weight relative to 100 parts by weight of the non-magnetic powder, and more preferably 15 to 40 parts by weight.

It is preferable that the magnetic coating material for forming a magnetic layer or the non-magnetic coating material for forming a non-magnetic layer further contains, in addition to the first binder resin or the second binder resin, a thermosetting cross-linking agent that causes crosslinking by bonding to the functional group of the first or second binder resin. As the cross-linking agent, it is preferable to use tolylene diisocyanate, hexamethylene diisocyanate, isophorone diisocyanate, a reaction product obtained by a reaction between the above-listed isocyanate and a compound having a plurality of hydroxyl groups such as trimethylol propane, or various polyisocyanates such as condensation products of the above-listed isocyanates. The cross-linking agent is used in an amount of, preferably 1 to 30 parts by weight, and more preferably 5 to 20 parts by weight relative to 100 parts by weight of the first or second binder resin. However, when a magnetic coating film is formed by wet-on-wet method on a non-magnetic coating film formed by applying a non-magnetic coating material onto a non-magnetic support, a part of polyisocyanate contained in the non-magnetic coating film is diffused and supplied into the magnetic coating film. Accordingly, even if the magnetic coating material does not contain polyisocyanate, crosslinking is effected to some extent in the magnetic coating film.

The magnetic layer 13 may contain, in addition to the magnetic powder, a non-magnetic powder. As the non-magnetic powder, an abrasive material, carbon black or the like can be used. With the use of carbon black, the conductivity of the magnetic layer 13 can be improved.

Examples of the abrasive material include α-alumina, β-alumina, silicon carbide, chromium oxide, cerium oxide, α-iron oxide, corundum, artificial diamond, silicon nitride, titanium carbide, titanium oxide, silicon dioxide, boron nitride, which mainly have a Mohs hardness of 6 or greater. They may be used alone or in combination of two or more.

The average particle size of the abrasive material is, when the magnetic layer 13 has a small thickness, namely, 0.01 to 0.2 μm, preferably 10 to 250 nm. When the magnetic layer 13 has a thickness greater than 0.2 μm, the average particle size of the abrasive material preferably is 50 to 1000 nm. The amount of the abrasive material preferably is 5 to 20 parts by weight relative to 100 parts by weight of the magnetic powder, and more preferably, 8 to 18 parts by weight.

Examples of the carbon black include acetylene black, furnace black and thermal black.

It is preferable that the carbon black has an average particle size of 10 to 100 nm. If the average particle size is too small, the carbon black is hardly dispersed. If the average particle size is too large, a large amount of carbon black is required. Accordingly, an excessively large or small average particle size is not preferable because the surface of the magnetic layer 13 may be roughened, reducing the output. The amount of the carbon black preferably is 0.2 to 5 parts by weight relative to 100 parts by weight of the magnetic powder, and more preferably 0.5 to 4 parts by weight.

<Lubricant>

It is preferable that the non-magnetic layer 12 further includes a fatty acid and a fatty acid ester as lubricants. When the non-magnetic layer 12 contains a fatty acid and a fatty acid ester in predetermined amounts, the friction coefficient of the magnetic tape against the head is reduced. It is preferable that 0.5 to 5.0 parts by weight of fatty acid and 0.2 to 3.0 parts by weight of fatty acid ester are contained in the non-magnetic coating material relative to 100 parts by weight of the non-magnetic powder contained in the non-magnetic layer 12. If the amount of the fatty acid is less than 0.5 parts by weight, the effect of reducing the friction coefficient will be small. If the amount of the fatty acid exceeds 5.0 parts by weight, the non-magnetic layer 12 will be plasticized, and stiffness may be lost. Likewise, if the amount of the fatty acid ester is less than 0.2 parts by weight, the effect of reducing friction coefficient will be small. If the amount of the fatty acid exceeds 3.0 parts by weight, the amount of the fatty acid ester that enters the magnetic layer 13 will increase excessively, which may cause harmful effects such as unwanted adherence of the magnetic tape to the head.

As the fatty acid, it is preferable to use a fatty acid having not less than 10 carbon atoms. The fatty acid having not less than 10 carbon atoms can be linear, branched, or an isomer such as a cis-isomer or trans-isomer. Preferred is a linear fatty acid because it exhibits excellent lubricating performance. Preferred examples of such a fatty acid include lauric acid, myristic acid, stearic acid, palmitic acid, behenic acid, oleic acid, and linolic acid. Among them, myristic acid, stearic acid, palmitic acid, and the like are particularly preferable.

Examples of the fatty acid ester include: a mixture of butyl stearate and butyl palmitate; dipropylene glycol monobutyl ether acylated with stearic acid: diol obtained by acylating hexamethylene diol with myristic acid; various ester compounds such as glycerin oleate; butyl stearate; sec-butyl stearate; isopropyl stearate; butyl oleate; amyl stearate; 3-methylbutyl stearate; 2-ethylhexyl stearate; 2-hexyldecyl stearate; butyl palmitate; 2-ethylhexyl myristate; oleyl oleate; butoxyethyl stearate; 2-butoxy-1-propyl stearate; and diethylene glycol dipalmitate.

The fatty acid listed above may be contained also in the magnetic layer 13. In this case, because the fatty acid migrates between the non-magnetic layer 12 and the magnetic layer 13, it is preferable to adjust the amount of the fatty acid contained in the magnetic coating material such that the total amount of the fatty acid contained in the magnetic layer 13 and the fatty acid contained in the non-magnetic layer 12 is 0.5 to 5.0 parts by weight relative to 100 parts by weight of the total amount of the powders (for example, both a magnetic powder and a non-magnetic powder) contained in the magnetic layer 13 and the non-magnetic powder contained in the non-magnetic layer 12. When the non-magnetic coating material contains a fatty acid, the magnetic coating material does not necessarily contain a fatty acid.

The magnetic layer 13 may contain both a fatty acid amide and a fatty acid ester as lubricants because the friction coefficient of the tape against the head while the tape is running can be reduced. The amount of the fatty acid amide contained in the magnetic coating material preferably is 0.5 to 3.0 parts by weight relative to 100 parts by weight of the magnetic powder, and the amount of the fatty acid ester preferably is 0.2 to 3.0 parts by weight relative to the same. If the amount of the fatty acid amide is less than 0.5 parts by weight, the effect of preventing burning that occurs when the head and the magnetic layer 13 come in contact with each other will be small. Conversely, if the amount of the fatty acid amide exceeds 3.0 parts by weight, the fatty acid amide may bleed out. Likewise, if the amount of the fatty acid ester is less than 0.2 parts by weight, the effect of reducing the friction coefficient will be small. Conversely, if the amount of the fatty acid ester exceeds 3.0 parts by weight, harmful effects may occur such as unwanted adherence of the magnetic layer 13 to the head. The lubricant of the magnetic layer 13 and that of the non-magnetic layer 12 can migrate with each other.

As a fatty acid of the fatty acid amide, for example, palmitic acid or stearic acid can be used. The fatty acid ester contained in the magnetic layer 13 may be the same fatty acid ester as listed above.

<Back Coat Layer>

In order to improve runnability and the like, it is preferable to form a back coat layer 14 on a main surface of the non-magnetic support 11 opposite to the main surface on which the magnetic layer 13 is formed. The back coat layer 14 preferably has a thickness of 0.2 to 0.8 μm. If the thickness of the back coat layer is too small, the effect of improving runnability will be insufficient. If the thickness is too large, the total thickness of the magnetic tape will be large, reducing the recording capacity per single magnetic tape.

The back coat layer 14 contains, for example, carbon black (CB). As the carbon black (CB), acetylene black, furnace black, thermal black, and the like can be used. Usually, a small particle size carbon black and a large particle size carbon black having relatively different particle sizes are used in combination. The combined use of a small particle size carbon black and a large particle size carbon black is preferable because the effect of improving runnability increases. It is preferable that the large particle size carbon black is contained in an amount of 5 to 15 parts by weight relative to 100 parts by weight of the small particle size carbon black.

The small particle size carbon black preferably has an average particle size of not less than 5 nm and less than 200 nm, and more preferably 10 to 100 nm. If the average particle size is too small, the dispersion of the carbon black in the coating material will be difficult. If the average particle size is too large, a large amount of carbon black will be required. Accordingly, the number-average particle size that is either too small or too large is not preferable because the surface of the back coat layer is roughened, which may affect (cause embossing on) the magnetic layer.

The large particle size carbon black preferably has an average particle size of 200 to 400 nm.

The total amount of the small particle size carbon black and the large particle size carbon black preferably is 60 to 98 wt % relative to the total powder weight of the back coat layer, and more preferably 70 to 95 wt %.

The back coat layer 14 preferably has an average surface roughness (Ra) of 3 to 8 nm, and more preferably 4 to 7 nm. If the back coat layer has magnetic properties, magnetic signals to be recorded in the magnetic layer 13 may be disrupted. Accordingly, the back coat layer usually is non-magnetic.

In the present invention, the average surface roughness (Ra) is obtained by measuring surface roughness for 10 fields of view by scanning white-light interferometry using "New View" 5000, a general-purpose three-dimensional surface structure analyzer available from ZYGO Corporation, and averaging the measured values. The measurement is performed at a zoom factor of 2 using an objective lens having a magnification of 50 times. Accordingly, the magnification is 100 times. The field of view used for the measurement is 72 µm×54 µm.

The back coat layer preferably contains, for example, iron oxide so as to improve the strength. The iron oxide preferably has an average particle size of 100 to 600 nm, and more preferably 200 to 500 nm. The amount of the iron oxide preferably is 2 to 40 wt % relative to the total powder weight, and more preferably 5 to 30 wt %. It is also preferable to add alumina having an average particle size of 100 to 600 nm in an amount of 0.5 to 5 wt % because the strength of the back coat layer can be further improved.

The back coat layer 14 contains a binder resin, and the binder resin of the back coat layer 14 may be the same binder resin as that contained in the magnetic layer 13 or the non-magnetic layer 12 described above. However, in order to reduce the friction coefficient and to improve the runnability of the magnetic head, it is preferable to use, as the binder resin, a combination of cellulose resin and a polyurethane-based resin. Usually, the amount of the binder resin preferably is 40 to 150 parts by weight relative to 100 parts by weight of the total amount of the powders contained in the back coat layer, and more preferably 50 to 120 parts by weight, further more preferably 60 to 110 parts by weight, and still further more preferably 70 to 110 parts by weight. If the amount is too small, the back coat layer 14 will have insufficient strength. If the amount is too large, the friction coefficient tends to be high. It is preferable that the binder resin contains 30 to 70 parts by weight cellulose resin and 20 to 50 parts by weight of polyurethane-based resin relative to 100 parts by weight of the total powder weight of the back coat layer. It is preferable that the coating material for forming the back coat layer 14 contains a cross-linking agent to harden the binder resin. As the cross-linking agent, for example, a polyisocyanate compound or the like can be used.

The cross-linking agent contained in the coating material for forming the back coat layer 14 may be, for example, the same cross-linking agent as that contained in the magnetic coating material for forming the magnetic layer 13 or the non-magnetic coating material for forming the non-magnetic layer 12 described above. Usually, the amount of the cross-linking agent preferably is 10 to 50 parts by weight relative to 100 parts by weight of the binder resin, and more preferably 10 to 35 parts by weight, and still more preferably 10 to 30 parts by weight. If the amount is too small, the strength of the back coat layer 14 will decrease. If the amount is too large, dynamic friction coefficient against SUS (stainless steel) will increase.

<Solvent>

The second solvent contained in the non-magnetic coating material for forming the non-magnetic layer 12 and the solvent contained in the coating material for forming the back coat layer 14 may be the same solvent as the first solvent contained in the magnetic coating material for forming the magnetic layer 13. The amount of the solvent-excluded components contained in the non-magnetic coating material used to form the non-magnetic layer and the amount of the solvent-excluded components contained in the coating material for forming the back coat layer 14 preferably are 10 to 50 wt %, and more preferably 20 to 35 wt %, from the same reason as described above for the magnetic coating material. Accordingly, the amount of the second solvent contained in the non-magnetic coating material preferably is 50 to 90 wt %, and more preferably 65 to 80 wt %, and the amount of the solvent contained in the coating material for forming the back coat layer 14 also preferably is 50 to 90 wt %, and more preferably 65 to 80 wt %.

Hereinafter, the present invention will be described in further detail with reference to examples, but it should be understood that the present invention is not limited thereto.

EXAMPLE

Non-magnetic Coating Material for Forming Non-Magnetic Layer (1) Component A
Acicular iron oxide (average particle size: 0.11 µm): 68 parts by weight
Carbon black (average particle size: δ 0.025 µm): 20 parts by weight
Granular alumina powder (average particle size: 0.4 µm): 12 parts by weight
Methyl acid phosphate: 1 part by weight
Vinyl chloride-hydroxypropyl acrylate copolymer resin: 9 parts by weight
($—SO_3Na$ group content: $0.7 \times 10^{-4}$ eq/g)
Polyester polyurethane resin: 5 parts by weight
(glass transition temperature: 40° C., $—SO_3Na$ group content: $1 \times 10^{-4}$ eq/g)
Tetrahydrofuran: 13 parts by weight
Cyclohexanone: 63 parts by weight
Methyl ethyl ketone: 137 parts by weight
(2) Component B
Butyl stearate: 2 parts by weight
Cyclohexanone: 50 parts by weight
Toluene: 50 parts by weight
(3) Component C
Polyisocyanate: 6 parts by weight
Cyclohexanone: 9 parts by weight
Toluene: 9 parts by weight <Magnetic Coating Material for Forming Magnetic Layer>
(1) Component a
Ferromagnetic iron-based metal magnetic powder: 100 parts by weight
(Al—Y—Fe—Co) [σs: 120 Am²/kg (120 emu/g), Hc:176.3 kA/m (2215 Oe), average
particle size: 45 nm, true density σ: 5.7 g/cc)
Vinyl chloride-hydroxypropyl acrylate copolymer resin: 17 parts by weight
Polyester polyurethane resin: 6 parts by weight
Granular alumina powder (average particle size: 0.2 µm): 10 parts by weight
Methyl acid phosphate: 4 parts by weight
Methyl ethyl ketone: 35 parts by weight
Cyclohexanone: 110 parts by weight
Toluene: 110 parts by weight
(2) Component b
Palmitic amide: 1 part by weight
Stearic amide: 1 part by weight
Cyclohexanone: 30 parts by weight
Toluene: 30 parts by weight
(3) Component c
Polyisocyanate: 6 parts by weight
Methyl ethyl ketone: 2 parts by weight
Cyclohexanone: 8 parts by weight
Toluene: 8 parts by weight Component A of the coating material components for forming a non-magnetic layer was kneaded in a batch type kneader. Component B was added to the kneaded Component A, followed by agitation, after which a dispersion treatment was performed for 60 minutes (residence time) using a sand mill. Then, Component C was added to the mixture of Component A and Component B, followed by agitation and filtration. Thus, a non-magnetic coating material for forming a non-magnetic layer was obtained.

Meanwhile, Component a was kneaded in a batch type kneader. Subsequently, Component h was added to the kneaded Component a, and the mixture was diluted while being agitated. Thus, an undispersed coating material was obtained. The undispersed coating material was subjected to a dispersion treatment for 90 minutes (residence time) using a nano mill (available from Asada Iron Works, Co., Ltd). Component c was then added to the mixture of Component a and Component h, followed by agitation and filtration. Thus, a magnetic coating material for forming a magnetic layer was obtained.

The above-prepared non-magnetic coating material for forming a non-magnetic layer was applied onto a 8 µm thick polyethylene naphthalate film as a non-magnetic support using an extrusion coater to form a non-magnetic coating film. Subsequently, the magnetic coating material for forming a magnetic layer was applied onto this non-magnetic coating film by wet-on-wet method using an extrusion coater to form a magnetic coating film.

The thickness of the non-magnetic coating film was set to 4.5 µm, so that the thickness after drying and calendering (i.e., the thickness of the non-magnetic layer) would be 0.9 µm, and the thickness of the magnetic coating film was set to 0.3 µm, so that the thickness after drying and calendering (i.e., the thickness of the magnetic layer) would be 0.08 µm. The application speed of the magnetic coating material for forming a magnetic layer was set to 150 m/min.

Subsequently, the laminate in which the non-magnetic coating film and the magnetic coating film were formed in this order on the non-magnetic support was passed through between magnets with the N poles facing each other (external magnetic field: 398 kA/m). Then, with the procedure shown in FIG. 2, magnetic field orientation was performed while removing the solvents contained in the non-magnetic coating film and the magnetic coating film.

In this example, the heater 4 shown in FIG. 2 is not used. In order to perform magnetic field orientation, five solenoid coils (external magnetic field: 398kA/m, five coils) were used. The conditions for drying, such as the temperature of hot air, the flow rate, the distance between the hot air supply unit and the magnetic coating film, are shown in Table 1.

<Components for coating material for forming back coat layer>
Carbon black (average particle size: 25 nm): 80 parts by weight
Carbon black (average particle size: 350 nm): 10 parts by weight
Granular iron oxide (average particle size: 50 nm): 10 parts by weight
Nitrocellulose: 45 parts by weight
Polyurethane resin: 30 parts by weight
Cyclohexanone: 260 parts by weight
Toluene: 260 parts by weight
Methyl ethyl ketone: 525 parts by weight
Polyisocyanate: 15 parts by weight All the components for the coating material for forming a back coat layer except for polyisocyanate were dispersed and mixed in a sand mill, after which polyisocyanate was added thereto. The obtained mixture was filtrated to obtain a coating material for forming a back coat layer. This coating material was applied onto a surface of the non-magnetic support opposite to the surface on which the magnetic layer had been formed, followed by drying.

The thus-obtained magnetic sheet was subjected to a mirror finishing treatment (calendering treatment) under the conditions of a temperature of 100° C. and a linear pressure of 196 kN/m, using a 7-stage calendar having metal rolls. Subsequently, the magnetic sheet wound around a core was subjected to aging at 60° C. for 48 hours to produce a magnetic tape for evaluation.

Similarly, magnetic sheets for evaluation of Examples 2 to 7 and Comparative examples 1 and 2 were produced in the same manner as in Example 1 except that the conditions for drying were changed as shown in Table 1.

The obtained magnetic sheets for evaluation were evaluated as follows. The results are shown in Table 1.

TABLE 1

|  |  |  | Ex. 1 | Ex. 2 | Ex. 3 | Ex. 4 | Ex. 5 | Ex. 6 | Ex. 7 | Com. Ex. 1 | Com. Ex. 2 |
|---|---|---|---|---|---|---|---|---|---|---|---|
| Drying process | First hot air supply unit | Temperature (° C.) | 70 | 70 | 70 | 70 | 70 | 70 | 70 | 70 | 70 |
|  |  | Flow rate (m/s) | 5 | 1 | 15 | 0.5 | 15 | 10 | 5 | 20 | 5 |
|  |  | Distance (cm) | 5 | 1 | 100 | 1 | 50 | 5 | 1 | 5 | 5 |
|  | Second hot air supply unit | Temperature (° C.) | 80 | 80 | 80 | 80 | 80 | 80 | 80 | 80 | 80 |

TABLE 1-continued

|  |  |  | Ex. 1 | Ex. 2 | Ex. 3 | Ex. 4 | Ex. 5 | Ex. 6 | Ex. 7 | Com. Ex. 1 | Com. Ex. 2 |
|---|---|---|---|---|---|---|---|---|---|---|---|
|  |  | Flow rate (m/s) | 5 | 1 | 15 | 0.5 | 15 | 5 | 5 | 20 | 20 |
|  |  | Distance (cm) | 5 | 1 | 100 | 1 | 50 | 5 | 1 | 5 | 5 |
|  | Third hot air supply unit | Temperature (° C.) | 100 | 100 | 100 | 100 | 100 | 100 | 100 | 100 | 100 |
|  |  | Flow rate (m/s) | 10 | 5 | 30 | 4 | 10 | 10 | 10 | 40 | 40 |
|  |  | Distance (cm) | 5 | 1 | 100 | 1 | 5 | 5 | 5 | 50 | 50 |
| Constant rate drying period |  | (sec.) | 5 | 10 | 0.2 | 12 | 0.5 | 1 | 3 | <0.08 | <0.08 |
| Surface temperature of magnetic coating film during constant rate drying period |  | Temperature (° C.) | 60 | 58 | 65 | 58 | 62 | 62 | 60 | 68 | 68 |
| Evaluation result | Roughness of magnetic coating layer | Rz (nm) | 23 | 22 | 25 | 25 | 25 | 23 | 22 | 29 | 30 |
|  | Volume filling ratio | (vol %) | 36 | 37 | 36 | 36 | 36 | 36 | 36 | 33 | 34 |
|  | Squareness ratio | Br/Bs | 0.85 | 0.85 | 0.845 | 0.82 | 0.85 | 0.85 | 0.85 | 0.79 | 0.83 |

<Constant Rate Drying Period>

Three infrared sensors (fiber type infrared thermometer (FTZ6 available from Japan Sensor Corporation)) were arranged with a spacing of 20 cm in the dry zone, and the surface temperature $T_s$ of the magnetic layer was measured. As long as the temperature difference obtained from the surface temperatures $T_s$ of the magnetic layer obtained from the three successively-arranged sensors in any combination falls within 2° C., it is assumed that constant rate drying is proceeding, and the constant rate drying period was measured.

<Surface Roughness of Magnetic Layer>

The average surface roughness Rz was obtained by measuring surface roughness for ten fields of view by scanning white-light interferometry using "New View" 5000, a general-purpose three-dimensional surface structure analyzer available from ZYGO Corporation, and averaging the measured values. The measurement was performed at a zoom factor of 2 using an objective lens having a magnification of 50 times. Accordingly, the magnification was 100 times. The field of view used for the measurement was 72 μm×54 μm.

<Magnetic Characteristics>

An external magnetic field of 0.8 MA/m (10 kOe) was applied to the magnetic sheet, after which a squareness ratio (Br/Bs) and a saturation magnetization value Mst (memu/cm²) per unit area of the magnetic layer were measured. For the measurement, VSM-P7, a vibrating sample magnetometer available from Toei Industry Co., Ltd, was used.

<Volume Filling Ratio>

The magnetic tape was sealed with resin, which was then cut out in the longitudinal direction of the tape using a focused ion beam cutting device to obtain cross-sections in the thickness direction of the magnetic tape. Subsequently, the cross sections were photographed (BSE image, magnification: 100,000 times) using a scanning electron microscope (SEM). Photographing was performed for ten fields of view such that the images do not have overlapping portions. Subsequently, for each image, a border was drawn along the interface between the magnetic layer and the non-magnetic layer. Also, a line was drawn along the outer surface of the magnetic layer that was opposite to the border. The line width was 0.5 mm.

Then, for each image, five different points were selected on the border, the shortest distance between each point and the outer surface of the magnetic layer was measured, and the resulting average value was denoted as thickness t (μm) of the magnetic layer. Using the Mst and thickness t (μm) of the magnetic layer, saturation magnetic flux density Bs (G) was determined by the following equation (1). Further, using the saturation magnetic flux density Bs, the saturation magnetization value σs (emu/g) and the true density ρ(g/cm³) of the magnetic powder, the volume filling ratio (vol %) of the magnetic powder was determined by the following equation (2).

$$Bs = 4\pi \times Mst/t \quad (1)$$

$$\text{Volume filling ratio (vol \%)} = Bs/(4\pi \cdot \sigma s \cdot \rho) \times 100 \quad (2)$$

Table 1 indicates that, for the magnetic tapes of Examples 1 to 6, the volume filling property of the magnetic powder was high, and excellent smoothness of the magnetic layer was obtained as compared to Comparative examples 1 to 2 in which the constant rate drying period was less than 0.2 seconds. As for the orientation (squareness ratio) of the magnetic powder, the magnetic tapes of Examples 1 to 6 exhibited a squareness ratio similar to those of Comparative examples, namely, not less than 0.8. It can also be seen that, when the constant rate drying period is not less than 0.2 seconds and less than 10 seconds, a magnetic recording medium superior to that of Comparative examples in terms of not only the smoothness of the magnetic layer and the filling property of the magnetic powder, but also the orientation (squareness ratio) of the magnetic powder can be obtained.

As described above, according to the present invention, in the magnetic layer forming step, constant rate drying is performed in which the surface temperature of the magnetic coating film is held substantially constant for 0.2 seconds or more, whereby it is possible to form a magnetic layer having a high magnetic powder filling ratio and excellent surface smoothness. Therefore, according to the present invention, it is possible to provide a large capacity magnetic recording medium capable of providing high output and a method for manufacturing the magnetic recording medium.

The foregoing described an example of the method for manufacturing a magnetic recording medium of the present invention, but this example is applicable to various other product fields that include the step of applying a coating material containing a powder and a binder resin onto a support, and drying to form a functional layer.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing a magnetic recording medium in which a magnetic layer is disposed on one main surface of a non-magnetic support, the method comprising a magnetic layer forming step in which a magnetic coating material containing a magnetic powder, a first binder resin and a first solvent is applied onto one main surface of the non-magnetic support to form a magnetic coating film, and a drying process is performed to remove the first solvent from the magnetic coating film so as to form the magnetic layer in which the magnetic powder is dispersed in the first binder resin,     wherein, in the magnetic layer forming step, the drying process comprises: a pre-heating stage in which the magnetic coating film is heated until a surface temperature of the magnetic coating film stops rising and reaches a substantially constant temperature; a constant rate drying stage that is performed after the pre-heating stage in which the surface temperature of the magnetic coating film is held substantially constant; and a falling rate drying stage that is performed after the constant rate drying stage in which the surface temperature of the magnetic coating film is increased to be higher than the surface temperature during the constant rate drying stage to harden the magnetic coating film,   in the magnetic layer forming step, the magnetic powder contained in the magnetic coating film is oriented in a predetermined direction in a magnetic field while performing the drying process,     wherein, a constant rate drying period in which the constant rate drying stage is performed is 0.2 seconds to 10 seconds,   the first solvent comprises one solvent or two or more solvents having different boiling points, a difference (Tb−Ts) between a boiling point Tb of the solvent having the lowest boiling point among the solvents contained in the first solvent and the surface temperature Ts of the magnetic coating film during the constant rate drying period is 1 to 50° C.

2. The method for manufacturing a magnetic recording medium according to claim 1,     wherein the constant rate drying period is 1 to 10 seconds.

3. The method for manufacturing a magnetic recording medium according to claim 1,     wherein the surface temperature of the magnetic coating film during the constant rate drying period is 30 to 80° C.

4. The method for manufacturing a magnetic recording medium according to claim 1, further comprising, before the application of the magnetic coating material, the step of forming a non-magnetic coating film by applying a non-magnetic coating material containing a non-magnetic powder, a second binder resin and a second solvent onto the one main surface of the non-magnetic support,     wherein the second solvent contained in the non-magnetic coating film is removed through the drying process performed in the magnetic layer forming step, whereby the non-magnetic coating film is converted into a non-magnetic layer.

5. The method for manufacturing a magnetic recording medium according to claim 4,     wherein a total thickness of the magnetic coating film before being subjected to the drying process and the non-magnetic coating film before being subjected to the drying process is 0.3 to 24 μm.

6. The method for manufacturing a magnetic recording medium according to claim 4,     wherein the second solvent comprises one solvent or two or more solvents having different boiling points, and   a difference between a boiling point of the solvent having the lowest boiling point among the solvents contained in the first and second solvents and the surface temperature of the magnetic coating film during the constant rate drying period is 1 to 50° C.

7. The method for manufacturing a magnetic recording medium according to claim 1,     wherein the magnetic powder comprises a ferromagnetic iron-based metal magnetic powder, and   the ferromagnetic iron-based metal magnetic powder has an average particle size of 10 to 60 nm.

8. The method for manufacturing a magnetic recording medium according to claim 1,     wherein the magnetic powder comprises an iron nitride magnetic powder, and   the iron nitride magnetic powder has an average particle size of 5 to 20 nm.

9. The method for manufacturing a magnetic recording medium according to claim 1,     wherein the magnetic powder comprises a hexagonal Ba-ferrite magnetic powder, and   the hexagonal Ba-ferrite magnetic powder has an average particle size of 10 to 30 nm.

10. The method for manufacturing a magnetic recording medium according to claim 1, wherein the magnetic powder contained in the magnetic coating film is oriented in the magnetic field at least until the falling rate drying stage is started.

11. The method for manufacturing a magnetic recording medium according to claim 1,     wherein hot air is used in the drying process, and   in the falling rate drying stage, a larger amount of heat is supplied to the magnetic coating film than that supplied during the constant rate drying stage.

* * * * *